(12) United States Patent
Nishimura

(10) Patent No.: US 9,069,171 B2
(45) Date of Patent: Jun. 30, 2015

(54) VIDEO PROJECTION DEVICE AND VIDEO PROJECTION METHOD

(75) Inventor: So Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 13/521,649

(22) PCT Filed: Dec. 28, 2010

(86) PCT No.: PCT/JP2010/073678
§ 371 (c)(1),
(2), (4) Date: Jul. 11, 2012

(87) PCT Pub. No.: WO2011/086849
PCT Pub. Date: Jul. 21, 2011

(65) Prior Publication Data
US 2012/0327049 A1    Dec. 27, 2012

(30) Foreign Application Priority Data

Jan. 13, 2010 (JP) ................................ 2010-004975

(51) Int. Cl.
*G03B 21/28* (2006.01)
*G02B 26/10* (2006.01)
(Continued)

(52) U.S. Cl.
CPC .............. *G02B 26/105* (2013.01); *G03B 21/14* (2013.01); *G03B 21/2053* (2013.01); *G03B 21/28* (2013.01); *H04N 9/3155* (2013.01); *G02B 26/101* (2013.01); *H04N 9/3135* (2013.01)

(58) Field of Classification Search
CPC .. G02B 26/085; G02B 26/101; G02B 26/105; G02B 26/0833; G03B 21/14; G03B 21/28; H04N 9/3129

USPC .............. 353/31, 69, 70, 94, 99; 348/68, 201, 348/208.11, 743–747; 359/200.7, 204.1, 359/201.1, 204.4, 212.2, 221.1, 224.1, 359/225.1, 291

See application file for complete search history.

(56) References Cited

U.S. PATENT DOCUMENTS 5,870,219 A * 2/1999 Plesko ...................... 359/199.1
(Continued)

FOREIGN PATENT DOCUMENTS

CN    1119482 A    3/1996
CN    1854801 A    11/2006
(Continued)

OTHER PUBLICATIONS

International Search Report of PCT/JP2010/073678, dated Apr. 12, 2011.
(Continued)

*Primary Examiner* — Sultan Chowdhury
(74) *Attorney, Agent, or Firm* — Sughrue Mion, PLLC

(57) ABSTRACT

There are provided a video projection device and a video projection method which can realize both a guarantee of safety and an increase in luminance of a screen. The video projection device includes: a laser light source unit which emits a laser; a laser scanning unit which is provided with one or more scanning directions and project video by performing a reciprocating scan of the laser with respect to a scanning direction with the highest scanning frequency; and a control unit which controls operations of the laser light source unit and the laser scanning unit depending on a video signal so that a scanning angle when emission of the laser in an outgoing path is stopped is different from a scanning angle when emission of the laser in a return path is started with respect to the scanning direction along which the reciprocating scan is performed.

17 Claims, 8 Drawing Sheets

(51) Int. Cl.
*G03B 21/14* (2006.01)
*G03B 21/20* (2006.01)
*H04N 9/31* (2006.01)

(56) References Cited

U.S. PATENT DOCUMENTS

| | | | |
|---|---|---|---|
| 6,590,606 B1 | 7/2003 | Hiller et al. | |
| 7,477,435 B2 * | 1/2009 | Yonekubo et al. | 359/196.1 |
| 7,583,417 B2 * | 9/2009 | Bush et al. | 358/474 |
| 2003/0021497 A1 | 1/2003 | Kandori et al. | |
| 2003/0117689 A1 * | 6/2003 | Helsel et al. | 359/292 |
| 2005/0190423 A1 * | 9/2005 | Sakai | 359/212 |
| 2006/0245462 A1 * | 11/2006 | Takeda | 372/93 |
| 2009/0141192 A1 * | 6/2009 | Nojima | 348/745 |
| 2010/0033691 A1 * | 2/2010 | Hung et al. | 353/70 |

FOREIGN PATENT DOCUMENTS

| | | |
|---|---|---|
| JP | 03-065916 A | 3/1991 |
| JP | 2000-509522 A | 7/2000 |
| JP | 2003-131151 A | 5/2003 |
| JP | 2004-341211 A | 12/2004 |

OTHER PUBLICATIONS

Communication dated Feb. 26, 2014, issued by the State Intellectual Property Office of the People's Republic of China in corresponding Application No. 201080061193.1.

* cited by examiner

VIDEO PROJECTION DEVICE AND VIDEO PROJECTION METHOD

CROSS REFERENCE TO RELATED APPLICATIONS

This application is a National Stage of International Application No. PCT/JP2010/073678 filed Dec. 28, 2010, claiming priority based on Japanese Patent Application No. 2010-004975 filed Jan. 13, 2010, the contents of all of which are incorporated herein by reference in their entirety.

TECHNICAL FIELD

The present invention relates to a video projection device and a video projection method. In particular, the present invention relates to a video projection device and video projection method which scan a laser light source to project video.

BACKGROUND ART

In recent years, small-sized low-price laser light sources have been manufactured. In addition, going with advancement in a MEMS (Micro-Electro-Mechanical Systems) technology, small-sized scanning elements that vibrate rapidly have been developed. Under such a background, a scanning-type laser projector has been developed which draws video by varying the angle of laser light with a MEMS mirror or the like to perform scanning on a projected plane (see, for example, Patent Document 1).

On the other hand, products using lasers are required to guarantee safety, and it is necessary to follow the safety regulations stipulated in the standards such as IEC (International Electrotechnical Commission) 60825 and JIS (Japan Industrial Standard) 6802.

In order to guarantee the safety of lasers, it is prescribed that the lasers are classified in conformity with the standards such as IEC 60825 and JIS 6802 and usage methods depending on classes must be followed. Lasers are classified into seven grades including classes 1, 1M, 2, 2M, 3R, 3B, and 4, and applicable purposes and applicable environments are limited depending on the respective classes. Here, the classification of the seven grades is recited in IEC 60825-1 published in 2007. In the following, a description conforming to this IEC will be given.

IEC 60825-1 stipulates that the safety of scanning-type lasers is evaluated using a repetitive pulse train in which a pulse time width is defined as a time that is required for a laser to pass through an aperture that has a diameter of 7 mm, simulates an eye of humans, and is disposed so as to be apart from a scanning unit by a given distance, and the number of pulses is defined as the number of times the laser passes through this aperture. In addition, IEC 60825-1 stipulates that the safety is to be evaluated under the most severe condition among the following three conditions about the repetitive pulse train. Herein, an example of a calculation conforming to the stipulation of class 2 will be shown. Here, $C_6$ is a correction factor depending on the size of a light source that is stipulated in the standard, t is the pulse time width, N is the number of pulses, and $\pi$ is the ratio of the circumference of a circle to its diameter.

A first condition is that the exposure from any single pulse within a pulse train shall not exceed the AEL (Accessible Emission Limit) for a single pulse.

[Formula 1]

$$P(a) = 5 \times 10^{-3} C_6 \left(\frac{7 \times 10^{-3}}{2}\right)^2 \pi \frac{1}{t} \quad \text{first condition}$$

A second condition is that the average power for a pulse train of emission duration shall not exceed the AEL for a single pulse of an emission time width.

[Formula 2]

$$P(b) = \frac{18.025^{0.75}}{N} C_6 \left(\frac{7 \times 10^{-3}}{2}\right)^2 \pi \frac{1}{t} \quad \text{second condition}$$

A third condition is that the average exposure for pulses within a pulse train shall not exceed the AEL for a single pulse multiplied by the correction factor $C_5 = N^{-1/4}$.

[Formula 3]

$$P(c) = 5 \times 10^{-3} C_5 \times C_6 \left(\frac{7 \times 10^{-3}}{2}\right)^2 \pi \frac{1}{t} \quad \text{third condition}$$

As is clear from the comparison with the third condition, the first condition is always laxer than the third condition, and thus it is not necessary to take the first condition into consideration.

By the way, as stipulated in IEC 60825-1, the safety must be taken into consideration under the situation in which the presumable largest exposure is experienced. When reciprocating scanning of a laser is performed, end portions are the positions at which the exposure level is largest. There are two reasons. A first reason is that when the laser is turned around, the laser is continuously irradiated by the period twice that in one-way scanning. A second reason is that particularly when a scanning element is a device using resonance, the scanning speed of the laser is significantly reduced at the end portions.

The upper limit of an output of a laser is determined by those at the end portions where the exposure level is largest, and the brightness of the entire screen is determined by those at the end portions. At an end portion, the number of pulses is reduced by a half and the passage period doubles. Assuming that this is applied to the second condition and the third condition, in the case of, for example, the third condition, the value of P(c) becomes $2^{-3/4}(=(\frac{1}{2})^{-1/4} \times (\frac{1}{2})) \approx 0.6$ times smaller than the value obtained in accordance with the above-described formula.

PRIOR ART DOCUMENT

Patent Document

Patent Document 1: Japanese Unexamined Patent Application, First Publication, No. Hei 03-065916

SUMMARY OF INVENTION

Problems to be Solved by the Invention

As described above, the upper limit of an output of a laser is determined by those at the end portions where the exposure level is largest, and the brightness of the entire screen is determined by those at the end portions. In addition, the upper limit of an output of a laser is determined in accordance with the safety criteria. For this reason, there is a problem in that it is not possible to realize both a guarantee of safety and an increase in luminance of a screen.

Means for Solving the Problems

An exemplary object of the present invention is to provide a video projection device and a video projection method that solves the foregoing problem.

In order to solve the problem, the present invention is a video projection device including: a laser light source unit which emits a laser; a laser scanning unit which is provided with one or more scanning directions and project video by performing a reciprocating scan of the laser with respect to a scanning direction with the highest scanning frequency; and a control unit which controls operations of the laser light source unit and the laser scanning unit depending on a video signal so that a scanning angle when emission of the laser in an outgoing path is stopped is different from a scanning angle when emission of the laser in a return path is started with respect to the scanning direction along which the reciprocating scan is performed.

The present invention is a video projection method including: emitting a laser; projecting video by performing a reciprocating scan of the laser with respect to a scanning direction with the highest scanning frequency among one or more scanning directions; and controlling emission of the laser and a scan of the laser depending on a video signal so that, with respect to the scanning direction along which the reciprocating scan is performed, a scanning angle when the emission of the laser in an outgoing path is stopped is different from a scanning angle when the emission of the laser in a return path is started.

Moreover, the present invention is a video projection device including: a laser light source unit which emits a laser; a laser scanning unit which is provided with one or more scanning directions and project video by performing a reciprocating scan of the laser with respect to a scanning direction with the highest scanning frequency at a predetermined scanning cycle; and a control unit which controls operations of the laser light source unit and the laser scanning unit depending on a video signal so that, with respect to the scanning direction along which the reciprocating scan is performed, a time difference between a time when emission of the laser in an outgoing path is stopped and a time when emission of the laser in a return path is started is longer than half an interval between adjacent pulses of the laser when the adjacent pulses are treated as a single pulse, wherein the predetermined scanning cycle is longer than the time difference×2/(1−a rate R), where an upper limit of an output of the laser is reduced by the rate R at a turnaround position of the reciprocating scan when the adjacent pulses of the laser are treated as a single pulse.

Moreover, the present invention is a video projection method including: emitting a laser; projecting video by performing a reciprocating scan of the laser at a predetermined scanning cycle with respect to a scanning direction with the highest scanning frequency among one or more scanning directions; controlling emission of the laser and a scan of the laser depending on a video signal so that, with respect to the scanning direction along which the reciprocating scan is performed, a time difference between an emission stop time of the laser in an outgoing path and an emission start time of the laser in a return path is longer than half an interval between adjacent pulses of the laser when the adjacent pulses are treated as a single pulse; and setting the predetermined scanning cycle so as to be longer than the time difference×2/(1−a rate R), where an upper limit of an output of the laser is reduced by the rate R at a turnaround position of the reciprocating scan when the adjacent pulses of the laser are treated as a single pulse.

The present invention is a video projection device including: a laser light source unit which emits a laser; a laser scanning unit which is provided with one or more scanning directions and project video by performing a reciprocating scan of the laser with respect to a scanning direction with the highest scanning frequency; and a control unit which controls operations of the laser light source unit and the laser scanning unit depending on a video signal so that a period during which the laser is emitted and a period during which emission of the laser is stopped are repeated alternately, and a period during which the emission of the laser is stopped is longer than a period corresponding to an angle that is necessary for the laser scanning unit to scan a range corresponding to the size of an eye along the scanning direction with the highest scanning frequency at a position apart therefrom by a distance with which the eye is in focus.

The present invention is a video projection method including: emitting a laser; projecting video by performing a reciprocating scan of the laser with respect to a scanning direction with the highest scanning frequency among one or more scanning directions; and controlling emission of the laser and a scan of the laser depending on a video signal so that a period during which the laser is emitted and a period during which emission of the laser is stopped are repeated alternately, and a period during which the emission of the laser is continuously stopped is longer than a period corresponding to an angle that is necessary to scan a range corresponding to the size of an eye along the scanning direction with the highest scanning frequency at a position apart therefrom by a distance with which the eye is in focus.

Moreover, the present invention is a video projection device including: a laser light source unit which emits a laser; a laser scanning unit which is provided with one or more scanning directions and projects video by performing a reciprocating scan of the laser with respect to a scanning direction with the highest scanning frequency; and a control unit which controls operations of the laser light source unit and the laser scanning unit depending on a video signal so that an output of the laser light source unit is in proportion to a scan angular velocity of the laser scanning unit or a scanning speed of the laser on a projected plane.

Moreover, the present invention is a video projection method including: emitting a laser; projecting video by performing a reciprocating scan of the laser with respect to a scanning direction with the highest scanning frequency among one or more scanning directions; and controlling emission of the laser and a scan of the laser depending on a video signal so that an output of the laser is in proportion to a scan angular velocity of the laser or to a scanning speed of the laser on a projected plane.

It is to be noted that the foregoing Summary of Invention does not enumerate all the necessary features of the present invention, and sub-combinations of these features may also be the invention.

Effects of the Invention

As is clear from the above description, the present invention controls an emission time of laser light depending on scanning of a laser, thereby making it possible to reduce the exposure level of the laser at the end portions, which are portions where the exposure level is largest in the related art. Accordingly, it is possible to provide a video projection device and a video projection method that are provided with: a means that achieves a guarantee of safety and an improvement in luminance of a screen at the same time; and a control means therefor.

MODE(S) FOR CARRYING OUT THE INVENTION

Hereinafter, the present invention will be described through exemplary embodiments of the invention. However, the following exemplary embodiments do not limit the invention recited in the claims. In addition, all the combinations of the features described in the exemplary embodiments are not always indispensable solving means for the present invention.

[Basic Mode]

Figure 1:
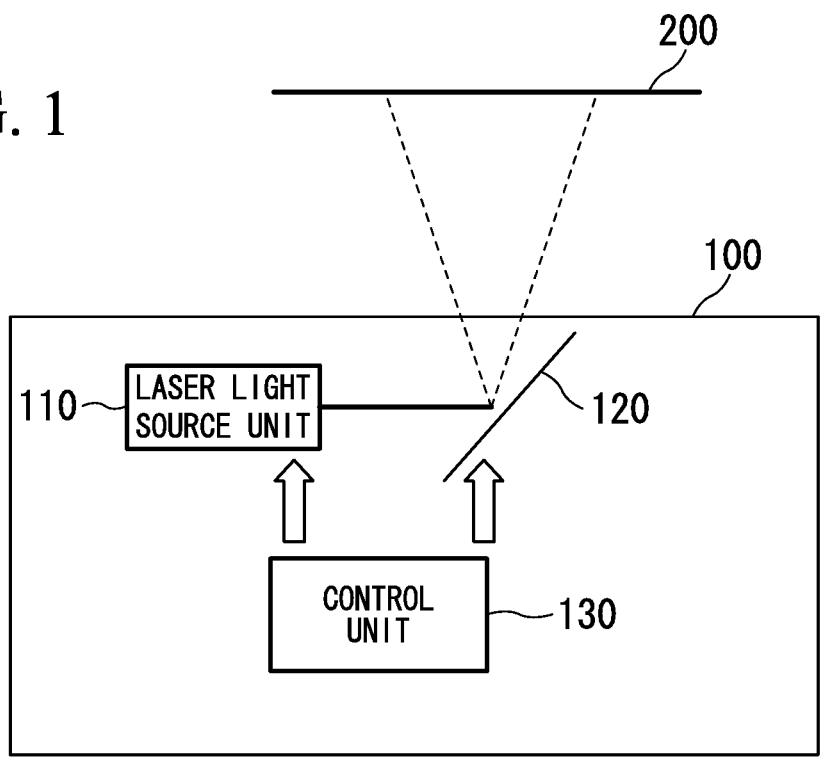
FIG. 1 is a block diagram illustrating an exemplary configuration of video projection devices in accordance with a basic mode as well as a first exemplary embodiment to a fifth exemplary embodiment of the present invention.

FIG. 1 illustrates an exemplary configuration of a video projection device in accordance with a basic mode of the present invention. A video projection device 100 is configured by a laser light source unit 110 which emits a laser, a laser scanning unit 120, and a control unit 130.

The angle (direction) of the laser that has been emitted from the laser light source unit 110 is varied by the laser scanning unit 120, and is scanned on a projected plane 200. The control unit 130 controls a light source output and an output time of the laser light source unit 110 and a scanning element of the laser scanning unit 120 depending on a video signal to project video on the projected plane 200 depending on the video signal.

The laser light source unit 110 emits one or more beams that form one optical axis. The laser light source unit 110 includes one or more laser light sources. When a plurality of laser light sources are provided, the laser light source unit 110 employs the structure of multiplexing the beams from these laser light sources into one beam. It is acceptable to employ the structure in which the laser light source unit 110 includes one laser light source and the laser light source unit 110 does not include a multiplexing means.

A conceivable example in which a plurality of wavelengths are multiplexed into one optical axis is the structure of multiplexing three wavelengths including red (wavelength: 640 nm), green (wavelength: 530 nm), and blue (wavelength: 450 nm) (in any of the instances, the wavelengths are typical examples) for the purpose of projecting full color video. There is also a structure in which another wavelength such as yellow (580 nm) is multiplexed so as to widen the chromaticity range. There is also a structure in which a plurality of lasers each having one wavelength are combined.

As a combiner, which is a means for combining lasers, there is a combiner using a wavelength selective mirror, a combiner using a half mirror, a combiner using a polarization selective mirror, a fiber-type combiner, a waveguide-type combiner, or the like. The emission times and the outputs of the laser light sources included in the laser light source unit 110 are controlled depending on the video signal and the laser scanning unit 120.

The laser scanning unit 120 is characterized in that it includes one or more scanning elements, scans a laser in one or more directions, and varies the travelling direction of laser light that enters the laser scanning unit 120 from the laser light source unit 110. The laser scanning unit 120 can employ the structure in which a single scanning element realizes scans for a plurality of directions or it can employ the structure in which a plurality of scanning elements realize scans for respective scanning directions independently of each other. The laser scanning unit 120 is controlled by the control unit 130.

As the scanning elements, there is a resonant vibrating mirror manufactured with a MEMS technology, a Galvano scanner, a GLV (grating light valve), a polygon scanner, an AOM (acoustic optic modulator) crystal, a KTP (KTiOPO4) crystal, a liquid crystal, other optical elements such as an oscillating lens or an oscillating mirror, or the like.

In addition, the video projection device 100 can include the function of monitoring the states of the laser light source unit 110 and the laser scanning unit 120 and of transmitting its result to the control unit 130. A method for monitoring these states from laser light includes a method using a photo-detection element such as a PD (photo diode).

The control unit 130 includes the function of controlling the laser light source unit 110 and the laser scanning unit 120 depending on the video signal. The control unit 130 can includes the function of receiving signals from the laser light source unit 110 and the laser scanning unit 120 and of changing control methods and/or control parameters. The control unit 130 controls the laser light source unit 110 so that the laser is emitted both in an outward path and a return path with respect to the scanning direction of the laser scanning unit 120 having the highest scanning frequency. In addition, the control unit 130 is characterized in that it controls an emission stop time and an emission start time when drawing is performed in the outward path and the return path with respect to the scanning direction having the highest scanning frequency among scanning directions of the laser scanning unit 120.

Subsequently, a description will be given of a method for controlling the emission stop time of the laser in the outgoing path and the emission start time of the laser in the return path. IEC 60825 stipulates that if the interval between adjacent pulses in a repetitive pulse train is less than or equal to 18 μs, the pulses are treated as the same pulse (they are treated as a single pulse). Such a definition is provided because an influence of a laser that has entered previously cannot be mitigated if a subsequent laser is irradiated after a short period of time. At an end portion, the period from when a laser has passed through an aperture in the outgoing path until when the returning laser enters the aperture in the return path is short. If this period is less than or equal to 18 μs, the pulses are treated as the same pulse. When the pulses are treated as the same pulse at the end portion, as described above, an upper limit of an output of the laser becomes $2^{-3/4} \approx 0.6$ times smaller.

Figure 2:
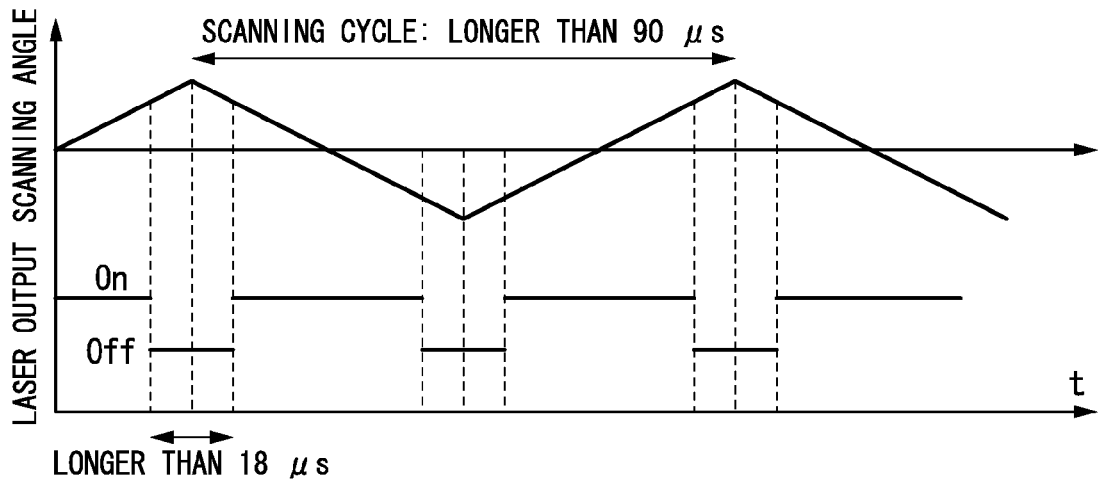
FIG. 2 is a diagram illustrating a scanning angle and a time displacement of a laser output in the basic mode.

A control method for avoiding this can be realized by providing a period without light emission that is longer than 18 μs at the end portion, which is a turnaround point, as shown in FIG. 2. It is possible to increase an output of a laser beam by providing the period without light emission.

However, if the period without light emission is long, the luminance of the entire screen is reduced by a rate corresponding to the period without light emission. When the period without light emission is longer than 18 μs and a scanning cycle is longer than 90 μs, the above-described control method is effective if a necessary rate of the period without light emission is less than 40% of ½ of the scanning cycle.

The luminance of the screen is calculated with the following formula. It is possible to increase the output using the above-described control method to the extent that the result of the following formula exceeds 1.

{the period that the laser passes through the aperture at the end portion}/{the period that the laser passes through the aperture at a position at which the exposure level is largest using the control}× {an irradiation period of the laser using the control}/{an irradiation period of the laser without using the control}

When a scan angular velocity is constant, an improvement in luminance using the above-described control method is expected if a scanning cycle T satisfies the condition of Formula (1).

[Formula 4]

$$\frac{18[\mu s]}{T/2} < 0.4 \Rightarrow T > 90[\mu s] \quad (1)$$

Figure 3:
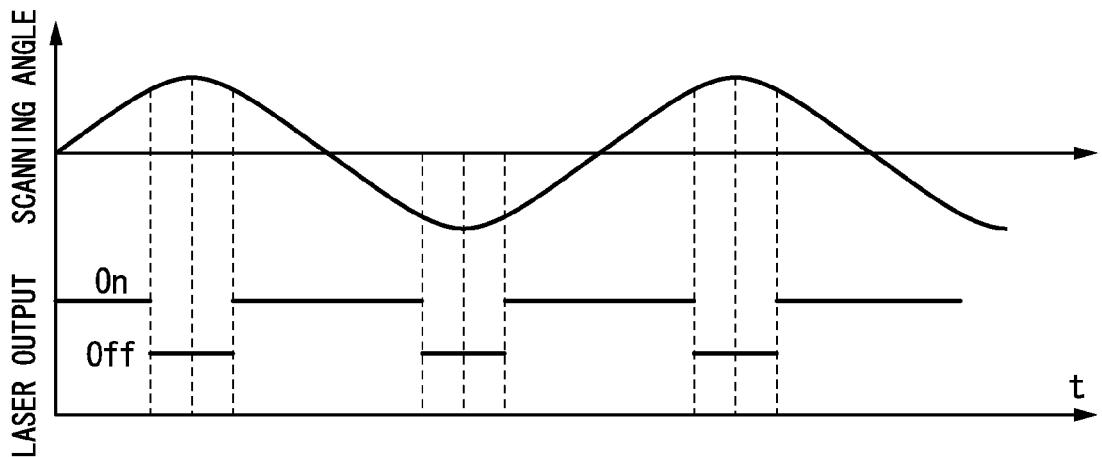
FIG. 3 is a diagram illustrating a scanning angle and a time displacement of a laser output in the basic mode.

In addition, as shown in FIG. 3, when the scanning speed is not constant (e.g., when a scanning element in which the larger the scanning angle is the smaller the scan angular velocity is, such as a MEMS mirror using resonance, is used), it may be possible to increase the luminance of the screen using the above-described control method even when the aforementioned period without light emission that is longer than 18 μs is not provided. For example, a change in speed of a resonating device has a feature that the speed at end portions is generally reduced. A reduction in speed corresponds to an increase in time required for passing through an aperture, thereby reducing an output limit. Accordingly, by providing the period without light emission as describe above, it is possible to avoid light emission at the end portions where the speed is smallest and to increase the output of the laser.

Figure 6:
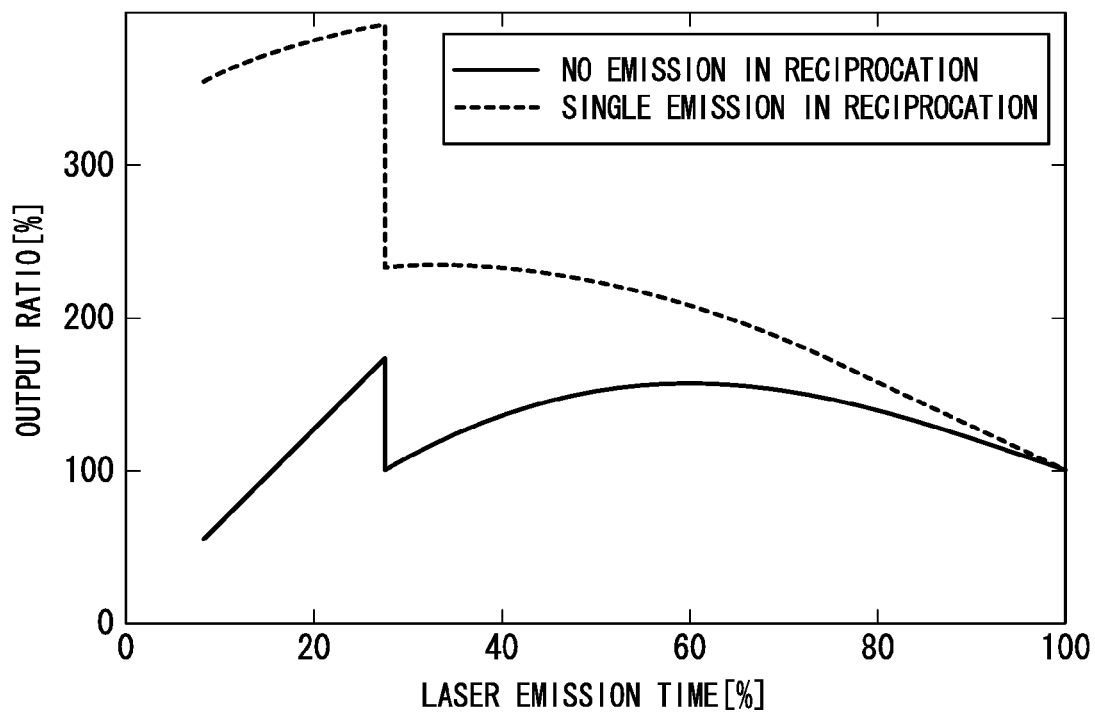
FIG. 6 is a diagram illustrating the relationship between a laser emission time and an output ratio in the basic mode.

A specific example is shown in FIG. 6 as "no emission during reciprocation". Calculating the luminance in the case in which the scanning element is resonating, the scanning cycle is 50 μs, and the scanning angle is 30 degrees, if a display period is set to 80%, the luminance is 1.4 times higher than that compared to the case in which the display period is set to 100%. Moreover, if the display period is set to 70%, the luminance is 1.5 times higher than that compared to the case in which the display period is set to 100%. Furthermore, this effect is largest if the display period is set to 60%, and the luminance is 1.6 times higher than that compared to the case in which the display period is set to 100%.

In addition, if the display period is set to 27%, the period from when the laser passes through the aperture at the end portion until when the laser reenters the aperture is longer than 18 μs, and, under the same safety criteria, it is possible to achieve a luminance 1.7 times higher than that when the display period is set to 100%.

Figure 4:
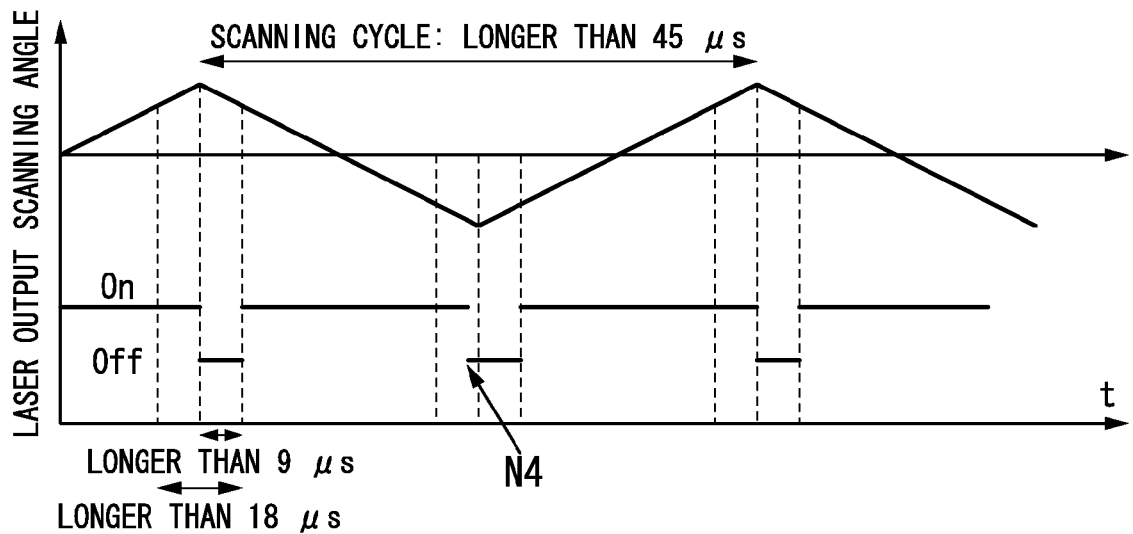
FIG. 4 is a diagram illustrating a scanning angle and a time displacement of a laser output in the basic mode and in the first exemplary embodiment.

Subsequently, if the period without light emission is not provided in the outgoing path but the period without light emission is provided in the return path as shown in FIG. 4, the period without light emission can be reduced by half compared to the above-case. For this reason, it is possible to suppress a reduction in luminance due to the period without light emission.

When the scan angular velocity is constant, an improvement in luminance using the above-described control is expected if the scanning cycle T satisfies the following.

[Formula 5]

$$\frac{18[\mu s]/2}{T/2} < 0.4 \Rightarrow T > 45[\mu s] \quad (2)$$

In addition, it is acceptable that the laser is emitted so far as it does not reach the turnaround point, and the emission is stopped at a smaller scanning angle. However, the laser shall not be output continuously from a time before the laser is turned around until a time after the laser crosses the endmost portion.

It is to be noted that, in FIG. 4, the period without light emission is not provided in the outgoing path, and the period without light emission is provided in the return path. However, it is acceptable that the period without light emission is provided in the outgoing path, and the period without light emission is not provided in the return path.

Figure 5:
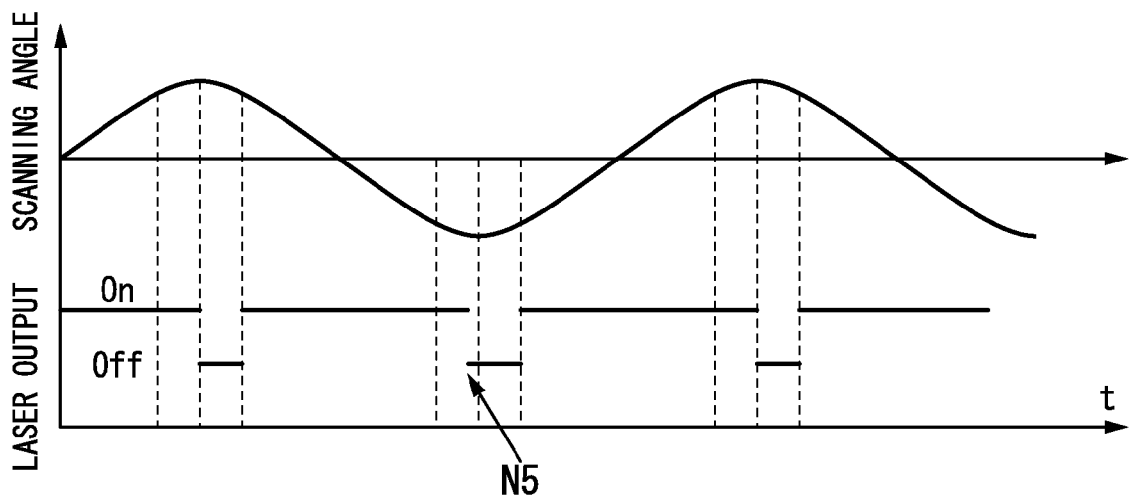
FIG. 5 is a diagram illustrating a scanning angle and a time displacement of a laser output in the basic mode and in the first exemplary embodiment

Similar to the above, if the scanning speed is not constant as shown in FIG. 5, it may be possible to increase the luminance of the screen using the above-described control method even when the period without light emission that is longer than 18 μs is not provided.

A specific example is shown in FIG. 6 as "single emission in reciprocation". Calculating the output in the case in which the scanning element is resonating, the scanning cycle is 50 μs, and the scanning angle is 30 degrees, the output when the display period is set to 80% is 1.6 times larger than that when the display period is set to 100%. Moreover, when the display period is set to 60%, the output is 2.1 times larger than that when the display period is set to 100%. Furthermore, this effect becomes largest when the display period is set to 35%, and the output is 2.4 times larger than that when the display period is set to 100%.

In addition, if the display period is set to 27%, the period from when the laser passes through the aperture at the end portion until when the laser reenters the aperture is longer than 18 μs, and, under the same safety criteria, it is possible to achieve a luminance 3.9 times higher than that when the display period is set to 100%.

[First Exemplary Embodiment]

Figure 7:
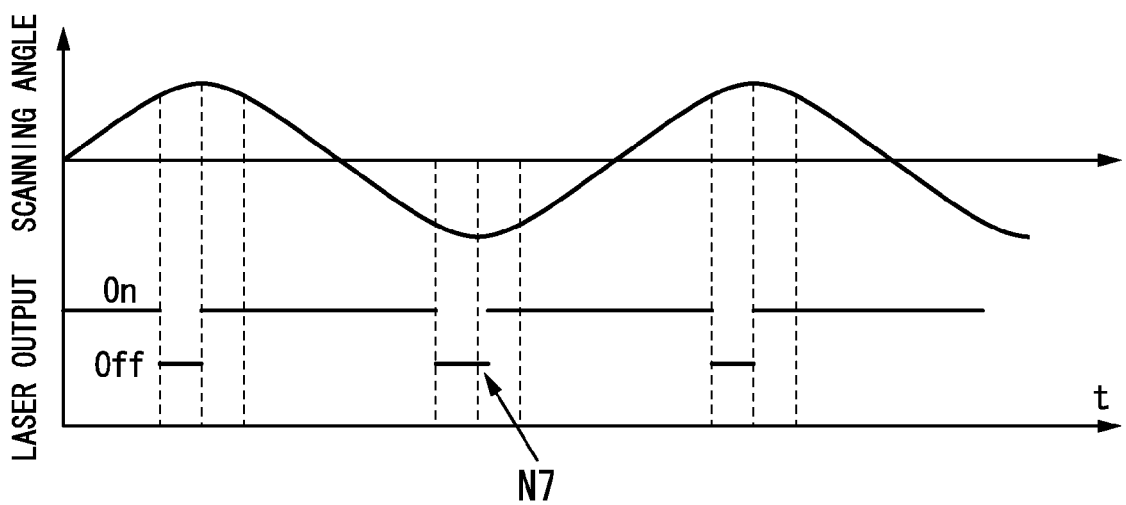
FIG. 7 is a diagram illustrating a scanning angle and a time displacement of a laser output in the first exemplary embodiment.

A first exemplary embodiment of the present invention will be described. FIG. 1 is a block diagram illustrating a configuration of a video projection device in accordance with the first exemplary embodiment, and its configuration has been described above. FIG. 4, FIG. 5, and FIG. 7 illustrate a control method of the first exemplary embodiment. With respect a scanning direction in the reciprocating drawing by the laser scanning unit 120, the control unit 130 electrically controls the output of the laser light source unit 110 so that a position in the outgoing path at which the emission is stopped is different from a position in the return path at which the scan is stopped.

As a result of the reciprocating scan, the laser enters an aperture disposed at a given place both in a scan in the outgoing path and a scan in the return path. At this time, as a period corresponding to the range of the scanning angle over which the emitted laser enters the aperture both in the outgoing path and in the return path, the period from when the laser passes through the aperture until when it reenters the aperture after it has been turned around is set so as to be longer than 18 µs. By doing so, the safety can be improved compared to the case in which this period is less than or equal to 18 µs.

As a result of an improvement in the safety, the laser output is increased under the same safety criteria. When an increase in the laser output is larger than a reduction in a radiation period due to the stop of the emission of the laser, an improvement in luminance can be achieved.

As shown in FIG. 4, when the scanning speed of the scanning element is constant and the scanning cycle of the scanning element is longer than 45 µs, if the period from when the output of the laser is stopped at the turnaround point until when the output of the laser is started is longer than 9 µs, the above-described condition is satisfied and the luminance is increased.

When a scanning element in which the larger the scanning angle is, the smaller the scan angular velocity is, such as a MEMS mirror using resonance, is used, even if the period from the turnaround point until when the output of the laser is started is not longer than 9 µs, it is possible to reduce the exposure level at a portion where the scanning speed is small as a result of the stop of the emission of the laser at the end portion, thereby making it possible to improve the safety (FIG. 5 and FIG. 7).

With respect to the position at which the emission of the laser is stopped and the position at which the emission of the laser is started, the output period in the outgoing path may be long and the output period in the return path may be short (FIG. 4 and FIG. 5), or the output period in the outgoing path may be short and the output period in the return path may be long (FIG. 7). That is, as shown in FIG. 4 as reference symbol N4 and in FIG. 5 as reference symbol N5, the position at which the emission is stopped may be before the turnaround point. In addition, as shown in FIG. 7 as reference symbol N7, the position at which the emission is started may be after the turnaround point.

In addition, it is acceptable that the laser is emitted so far as it does not reach the turnaround point, and the emission is stopped therebefore. However, the laser shall not be output continuously from a time the laser is turned around until a time after the laser crosses the endmost portion. This is because the exposure level is largest at the end portion.

[Second Exemplary Embodiment]

Figure 8:
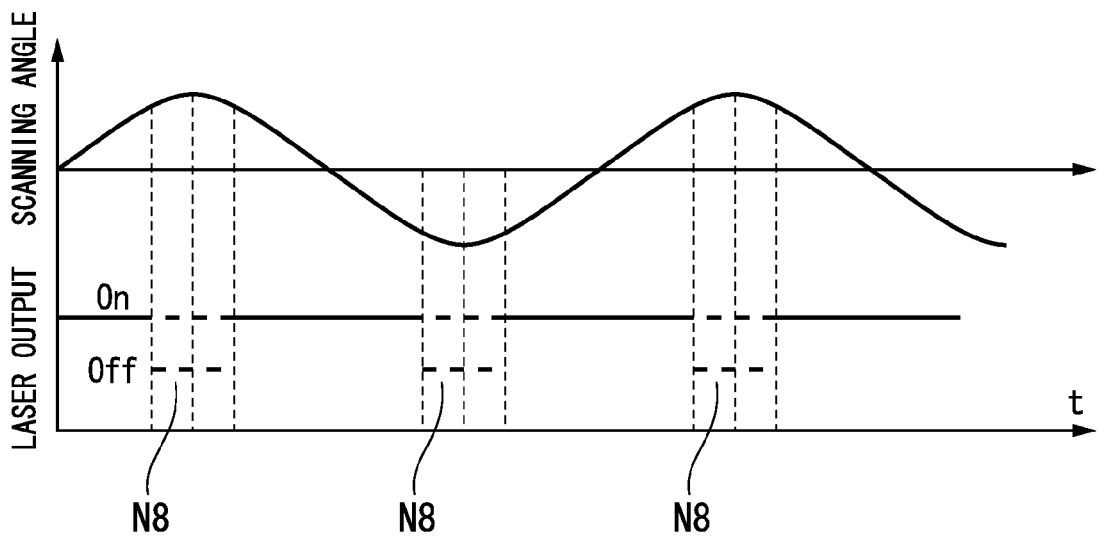
FIG. 8 is a diagram illustrating a control method of the second exemplary embodiment.

A second exemplary embodiment of the present invention will be described. A video projection device in accordance with the present exemplary embodiment has the same structure as that of the video projection device in accordance with the first exemplary embodiment. FIG. 8 illustrates a control method in accordance with the second exemplary embodiment. The stop and the start of the emission of the laser are performed alternately both in the outgoing path and in the return path in the range in which the first exemplary embodiment stops the emission of the laser in the outgoing path or in the return path (i.e., the range within 18 µs at the end portion).

In the first exemplary embodiment, the emission of the laser is stopped in at least one of the outgoing path and the return path. However, the period during which the output of the laser is stopped is originally the period during which image signals are to be output, and it leads to a reduction in resolution of the number of pixels in the case of raster-scan video projection devices.

In accordance with the control method of the second exemplary embodiment, the emission of the laser is not completely stopped by repeating the period during which the laser is emitted and the period during which the emission of the laser is stopped alternately, and thus it is possible to suppress a reduction in resolution.

As shown in FIG. 8 as reference symbol N8, it is desirable that a scan be performed for an angle that is larger than 4 degrees from when the output of the laser is stopped until when the output of the laser is started again (one section). This is the angle that is necessary for the laser to pass through an aperture of 7 mm simulating an eye which is disposed at a position that is apart therefrom by 100 mm at which an eye of humans is in focus. In other words, this angle is the angle that is necessary for the laser scanning unit 120 to scan the range corresponding to the size of an eye along the scanning direction of the reciprocating drawing at a position that is apart from the laser scanning unit 120 by the distance with which the eye is in focus. When the one section is less than or equal to 4 degrees, two or more pulses enter the aperture. In addition, from the viewpoint of the safety, it is more desirable that an emission position in the outgoing path do not overlap with an emission position in the return path.

[Third Exemplary Embodiment]

Figure 9:
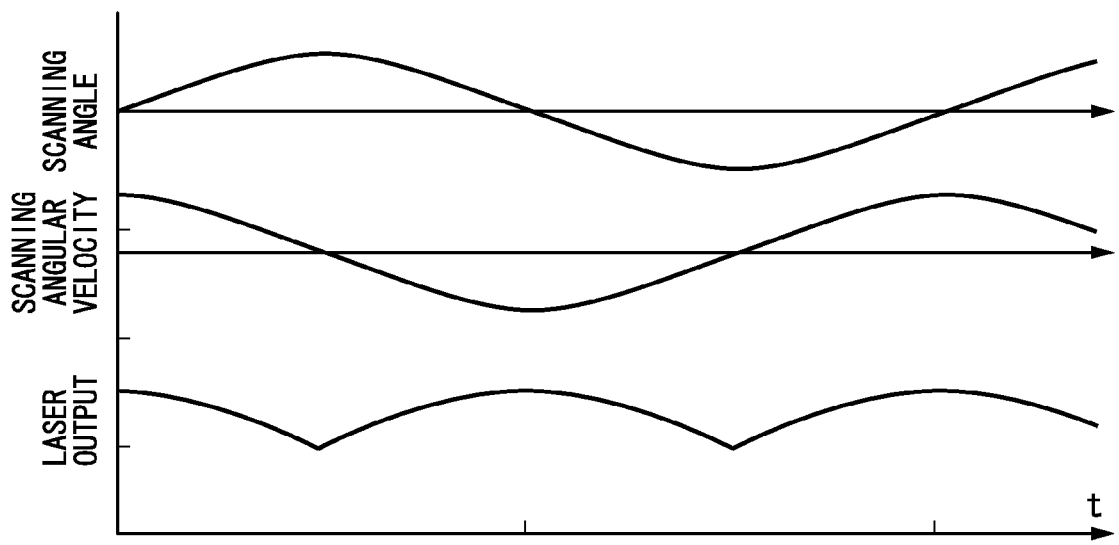
FIG. 9 is a diagram illustrating a control method of the third exemplary embodiment.

A third exemplary embodiment of the present invention will be described. A video projection device in accordance with the present exemplary embodiment has the same structure as those of the video projection devices in accordance with the first exemplary embodiment and the second exemplary embodiment. FIG. 9 illustrates a control method of the third exemplary embodiment. The control unit 130 controls the laser light source unit 110 so that the slower the scan angular velocity is (the smaller the scan angular velocity is), the smaller the laser output is (i.e., so that the laser output becomes smaller in proportion to the scan angular velocity). Since the laser output is small at the end portion where the speed is small, it is possible to secure the safety.

In addition, the luminance at a given position is calculated by integrating the output of the laser irradiated at the position with respect to time. In the case of a scanning system, the period during which the laser is irradiated is inversely proportional to the scanning speed on the projected plane 200.

Figure 10:
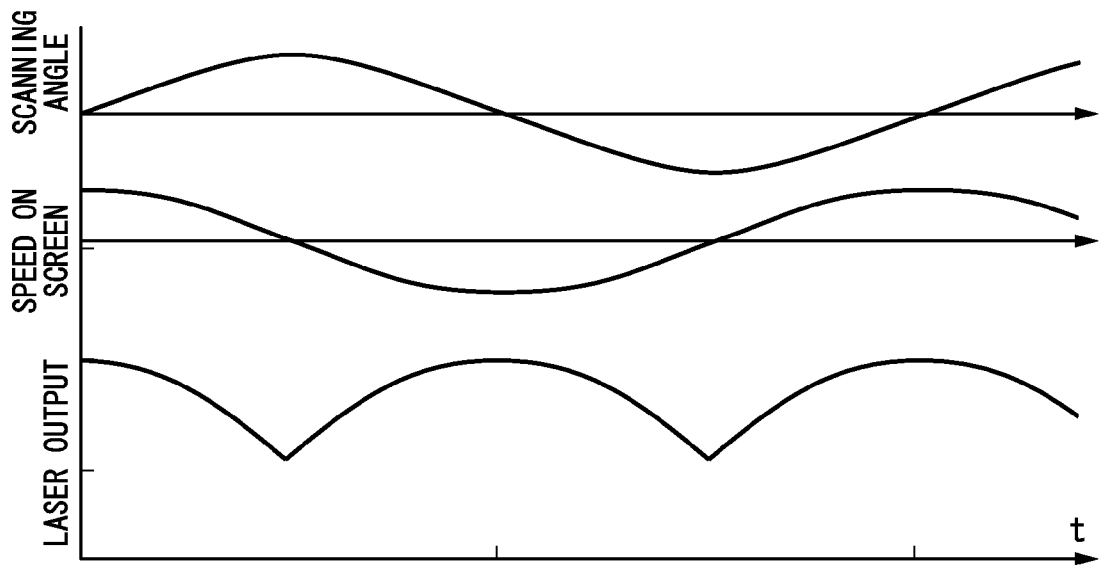
FIG. 10 is a diagram illustrating a scanning angle, a speed on a screen, and a time displacement of a laser output.

As shown in FIG. 10, in order to keep the luminance on the screen constant, it is desirable that the laser output be controlled so as to be proportional to the speed on the projected plane 200. In addition, there may be provided a period during which the emission of the laser is stopped at a turnaround position.

[Fourth Exemplary Embodiment]

Figure 11:
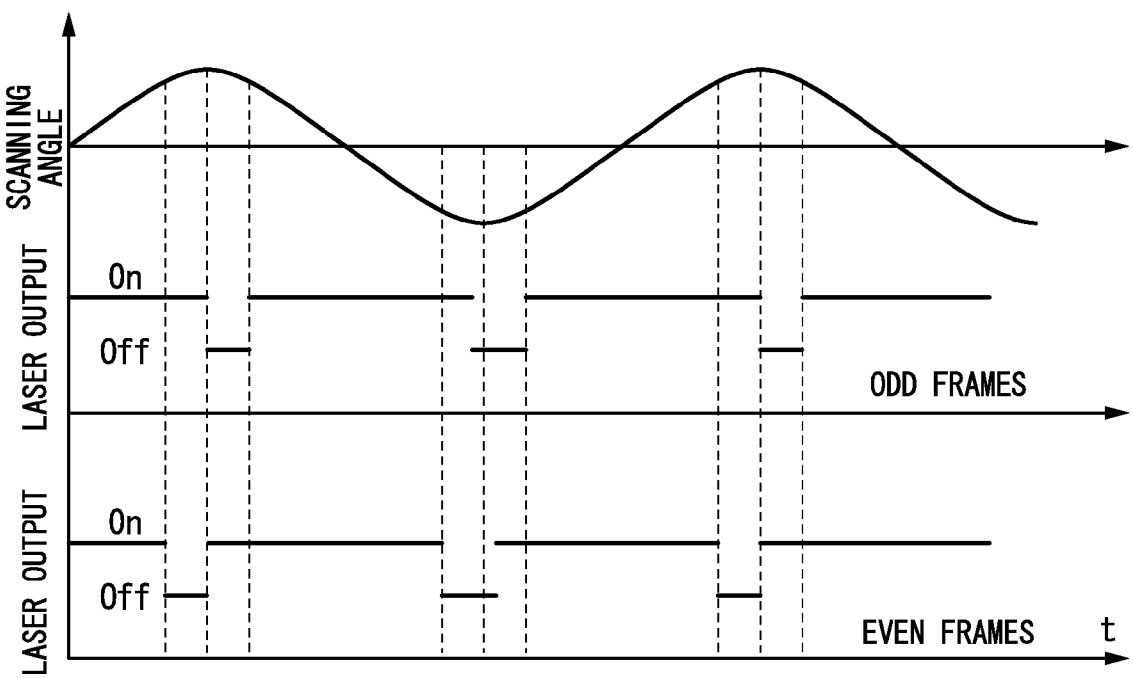
FIG. 11 is a diagram illustrating a control method of the fourth exemplary embodiment.

A fourth exemplary embodiment of the present invention will be described. A video projection device in accordance with the present exemplary embodiment has the same structure as those of the video projection devices in accordance with the first exemplary embodiment to the third exemplary embodiment. FIG. 11 illustrates a control method of the fourth exemplary embodiment. The present exemplary embodiment switches control among the methods described in the basic mode and the first exemplary embodiment to the third exemplary embodiment so as to conform to a scanning cycle of a scanning direction that is different from the fastest scanning direction (the highest scanning frequency). It is to be noted that, for example, with respect to some scan-type video devices, the frame rate of video corresponds to the foregoing cycle.

FIG. 11 illustrates an exemplary method for switching control of the positions at which the emission is stopped in the outgoing path and the return path in the first exemplary embodiment on a frame-by-frame basis. The scanning angle at which the emission is stopped and the scanning angle at which the emission is started at a turnaround position are switched between odd frames and even frames.

Humans perceive light integrated over a given period. For this reason, for example, the portion where alternate switching is performed at an interval approximately corresponding to a video frame (30 Hz) is recognized as an averaged image. As a result, it is possible to prevent a reduction in resolution from occurring.

[Fifth Exemplary Embodiment]

Figure 12:
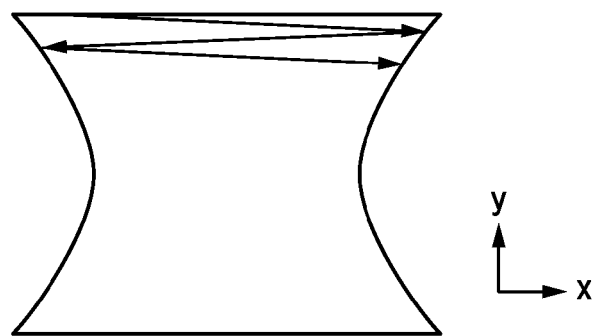
FIG. 12 is a diagram illustrating the concept of the fifth exemplary embodiment.
Figure 13:
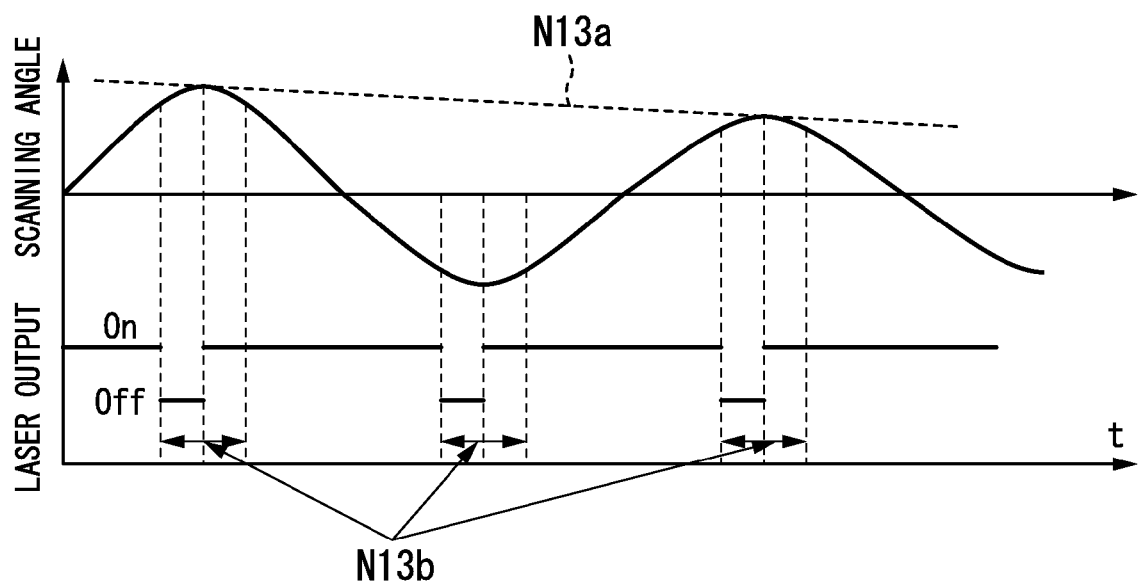
FIG. 13 is a diagram illustrating a control method of the fifth exemplary embodiment.

A fifth exemplary embodiment of the present invention will be described. A video projection device in accordance with the present exemplary embodiment has the same structure as those of the video projection devices in accordance with the first exemplary embodiment to the fourth exemplary embodiment. FIG. 12 and FIG. 13 illustrate a conceptual diagram and a control method of the fifth exemplary embodiment. When scanning elements perform scans in a plurality of directions, the scanning angle in a high-speed scanning direction may change or the scanning angle in the high-speed scanning direction may be changed depending on the scanning angle and/or the scanning cycle in a low-speed scanning direction. In such cases, it is possible to project video with a higher luminance and higher image quality by changing the control method and/or parameters on a line-by-line basis.

For example, when the laser scanning unit 120 has two scanning directions and performs scans along the respective directions using independent scanning elements, it is assumed that a first scanning direction is an x direction and a second scanning direction is a y direction. Moreover, it is assumed that high-speed reciprocating drawing is performed along the first scanning direction. FIG. 12 is a projection view in this case. As can be understood from FIG. 12, the range of the scanning angle in the x direction varies depending on the scanning angle in the y direction.

Since the period that the laser passes through the aperture or the like depends on the scanning angle, it is desirable that the emission stop time and the emission start time be changed along the second scanning direction as shown in FIG. 13. That is, control is performed so that the range of the scanning angle varies on a line-by-line basis as shown in FIG. 13 as reference symbol N13a. To this end, the emission stop position and the emission start position are controlled on a line-by-line basis as shown in FIG. 13 as reference symbol N13b. In addition, by controlling the emission stop time to control the emission stop position in the x direction on the screen, it is possible to project video having a desired shape and to provide high quality video. The shape can be any shape and it is not limited to a square.

[Sixth Exemplary Embodiment]

Figure 14:
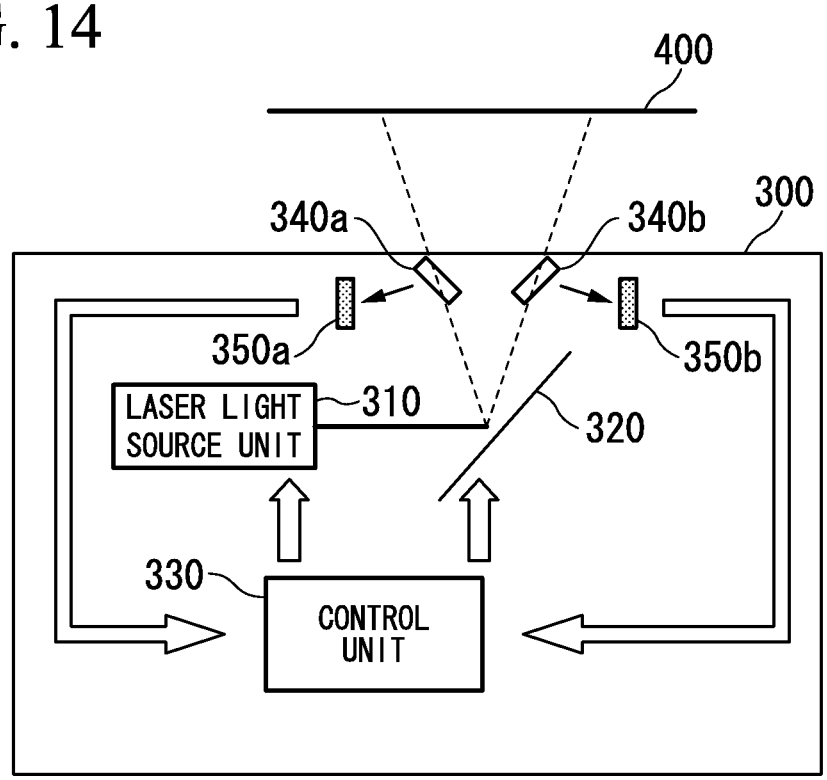
FIG. 14 is a diagram illustrating a configuration of a video projection device in accordance with a sixth exemplary embodiment.

A sixth exemplary embodiment of the present invention will be described. FIG. 14 is a block diagram illustrating a configuration of a video projection device 300 in accordance with the sixth exemplary embodiment. In the sixth exemplary embodiment, partially transparent mirrors 340a and 340b which change light paths of parts of lasers are disposed within a scan range scanned by a laser scanning unit 320, and the parts of the lasers, the light paths of which have been changed, enter photo-detection elements 350a and 350b, respectively. Signals indicating the detection results of the photo-detection elements 350a and 350b are transmitted to a control unit 330, and they are used for their control. The other configurations (e.g., a laser light source unit 310 and a projected plane 400) are similar to those of the video projection devices described in the first exemplary embodiment to the fifth exemplary embodiment.

With the present structure, it is possible to implement the above-described basic mode and the respective exemplary embodiments more easily. An example will be described for the case in which the present structure is applied to the second exemplary embodiment. In this case, the photo-detection elements 350a and 350b are disposed at positions corresponding to the emission stop position and the emission start position of the laser. Then, if one of the photo-detection elements detects light in the outgoing path, the control described in the second exemplary embodiment is started from that timing; if the other photo-detection element detects light in the return path, control is performed so that the laser is continuously emitted again from that timing. As a result, it is possible to implement the second exemplary embodiment more easily.

It is desirable that the partially transparent mirrors 340a and 340b have a high transmittance so as not to reduce the luminance. An example is glass or the like. PDs or the like can be used as the photo-detection elements 350a and 350b.

It is to be noted that there is a possibility that the standards are amended in the future and criteria of the classification are amended. However, the security criteria are prepared taking the tolerance of eyes of humans into consideration, and the significance of the present invention will not be affected.

While the present invention has been particularly shown and described with reference to exemplary embodiments thereof, the present invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-004975, filed on Jan. 13, 2010, the disclosure of which is incorporated herein in its entirety by reference.

INDUSTRIAL APPLICABILITY

The present invention can be used for, for example, video projection devices which scan a laser light source to project video. The present invention can achieve a guarantee of safety and an improvement in luminance of a screen at the same time.

DESCRIPTION OF REFERENCE SYMBOLS

100 video projection device
110 laser light source unit
120 laser scanning unit
130 control unit
200 projected plane
300 video projection device
310 laser light source unit
320 laser scanning unit 330 control unit
340a, 340b partially transparent mirror
350a, 350b photo-detection element
400 projected plane

The invention claimed is:

1. A video projection device comprising:
a laser light source unit which is configured to emit a laser;
a laser scanning unit which is provided with one or more scanning directions and is configured to project video by performing a reciprocating scan of the laser with respect to a scanning direction with a highest scanning frequency; and
a control unit which is configured to control operations of the laser light source unit and the laser scanning unit depending on a video signal, so that a scanning angle when emission of the laser in an outgoing path is stopped is different from a scanning angle when emission of the laser in a return path is started, with respect to the scanning direction along which the reciprocating scan is performed.

2. The video projection device according to claim 1, wherein the control unit is configured to switch a control method at a time interval of a scanning cycle in a scanning direction that is different from the scanning direction with the highest scanning frequency.

3. The video projection device according to claim 1, wherein the control unit is configured to control an emission start position and an emission stop position of the laser to change the range of a scanning angle of the laser at an interval of a scanning cycle in the scanning direction with the highest scanning frequency.

4. The video projection device according to claim 1, further comprising:
a partially transparent minor which is disposed in a scan range of the laser scanning unit and which is configured to change a light path of part of the laser; and
a photodetector which is configured to detect the laser, the light path of which has been changed and notifies the control unit,
wherein the control unit is configured to control starting and stopping of emission of the laser based on timing when the laser the light path of which has been changed is detected by the photodetector.

5. A video projection device comprising:
a laser light source unit which is configured to emit a laser;
a laser scanning unit which is provided with one or more scanning directions and is configured to project video by performing a reciprocating scan of the laser with respect to a scanning direction with a highest scanning frequency at a predetermined scanning cycle; and
a control unit which is configured to control operations of the laser light source unit and the laser scanning unit depending on a video signal, so that, with respect to the scanning direction along which the reciprocating scan is performed, a time difference between a time when emission of the laser in an outgoing path is stopped and a time when emission of the laser in a return path is started is longer than half an interval between adjacent pulses of the laser when the adjacent pulses are treated as a single pulse,
wherein the predetermined scanning cycle is longer than the time difference ×2/(1−a rate R), where an upper limit of an output of the laser is reduced by the rate R at a turnaround position of the reciprocating scan when the adjacent pulses of the laser are treated as a single pulse.

6. The video projection device according to claim 5, wherein the control unit is configured to control the operations of the laser light source unit and the laser scanning unit so that the time difference is longer than the interval and the predetermined scanning cycle is longer than the time difference longer than the interval ×2/(1−R).

7. The video projection device according to claim 5, wherein the control unit is configured to perform control so that a scanning angle when the emission of the laser in the outgoing path is stopped is different from a scanning angle when the emission of the laser in the return path is started with respect to the scanning direction along which the reciprocating scan is performed.

8. The video projection device according to claim 7, wherein the control unit is configured to perform control so that the scanning angle when the emission of the laser in the return path is started is smaller than the scanning angle when the emission of the laser in the outgoing path is stopped with respect to the scanning direction along which the reciprocating scan is performed.

9. The video projection device according to claim 7, wherein the control unit is configured to perform control so that the scanning angle when the emission of the laser in the return path is started is larger than the scanning angle when the emission of the laser in the outgoing path is stopped with respect to the scanning direction along which the reciprocating scan is performed.

10. The video projection device according to claim 5, wherein the control unit is configured to switch a control method at a time interval of a scanning cycle in a scanning direction that is different from the scanning direction with the highest scanning frequency.

11. The video projection device according to claim 5, wherein the control unit is configured to control an emission start position and an emission stop position of the laser to change the range of a scanning angle of the laser at an interval of a scanning cycle in the scanning direction with the highest scanning frequency.

12. The video projection device according to claim 5, further comprising:
a partially transparent minor which is disposed in a scan range of the laser scanning unit and which is configured to change a light path of part of the laser; and
a photodetector which is configured to detect the laser, the light path of which has been changed and to notify the control unit,
wherein the control unit is configured to control starting and stopping of emission of the laser based on timing when the laser the light path of which has been changed is detected by the photodetector.

13. A video projection device comprising:
a laser light source unit which is configured to emit a laser;
a laser scanning unit which is provided with one or more scanning directions and is configured to project video by performing a reciprocating scan of the laser with respect to a scanning direction with a highest scanning frequency; and
a control unit which is configured to control operations of the laser light source unit and the laser scanning unit depending on a video signal, so that a period during which the laser is emitted and a period during which emission of the laser is stopped are repeated alternately, and a period during which the emission of the laser is continuously stopped is longer than a period corresponding to an angle that is necessary for the laser scanning unit to scan a range corresponding to the size of an eye along the scanning direction with the highest scanning frequency at a position apart therefrom by a distance with which the eye is in focus.

14. The video projection device according to claim 13, wherein the control unit is configured to perform control so that a period during which the laser is emitted in an outgoing path does not overlap with a period during which the laser is emitted in a return path.

15. The video projection device according to claim 13, wherein the control unit is configured to switch a control method at a time interval of a scanning cycle in a scanning direction that is different from the scanning direction with the highest scanning frequency.

16. The video projection device according to claim 13, wherein the control unit is configured to control an emission start position and an emission stop position of the laser to change the range of a scanning angle of the laser at an interval of a scanning cycle in the scanning direction with the highest scanning frequency.

17. The video projection device according to claim 13, further comprising:
- a partially transparent mirror which is disposed in a scan range of the laser scanning unit and which is configured to change a light path of part of the laser; and
- a photodetector which is configured to detect the laser, the light path of which has been changed and to notify the control unit,
- wherein the control unit is configured to control starting and stopping of emission of the laser based on timing when the laser the light path of which has been changed is detected by the photodetector.

\* \* \* \* \*